Patented Dec. 13, 1932

1,891,149

UNITED STATES PATENT OFFICE

FRANZ ELGER, OF BASEL, SWITZERLAND, ASSIGNOR TO HOFFMAN-LA ROCHE INC., OF NUTLEY, NEW JERSEY, A CORPORATION OF NEW JERSEY

PROCESS FOR THE MANUFACTURE OF PROTOCATECHUIC ALDEHYDE AND ITS SUBSTITUTION PRODUCTS

No Drawing. Application filed November 19, 1931, Serial No. 576,218, and in Germany December 8, 1930.

It has been found that protocatechuic aldehyde and its products of substitution may easily be obtained with a good yield by allowing hydrogenperoxide in alkaline solution to react with 4-hydroxyisophthalaldehyde and its derivatives.

Through the researches of Dakin (American Chemical Journal, vol. 42, 1909, page 477) it has become known, that by treating o- and p-hydroxybenzaldehydes with hydrogenperoxide in alkaline solution o- and p-dihydroxybenzene compounds are obtained. It was impossible to foretell what course this interesting reaction, that is the exchange of the aldehyde group for the hydroxy group, would take, if an aldehyde group were present in the ortho- as well as in the para-position to the hydroxy group. It has now been found that it is surprisingly easy to exchange only the ortho-aldehyde group for the hydroxyl group and that thus dihydroxybenzaldehydes are obtainable in very good yield.

Example 1

15 parts of 4-hydroxyisophthalaldehyde are dissolved in 100 parts by volume of normal sodium hydroxide and to this is added an equimolecular quantity of hydrogenperoxide. The solution, which at first is yellow, soon changes its color to reddish-brown. By extraction with ether the protocatechuic aldehyde is isolated from the reaction product; after recrystallization from water it melts at 150° C. The equation of this reaction is as follows:

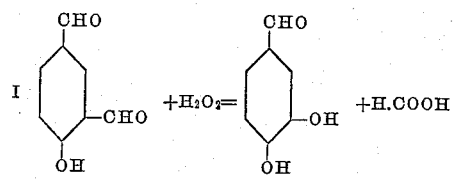

Example 2

18 parts of 4-hydroxy-5-methoxyisophthalaldehyde (cf. J. and P. Koetschet, Helvetica Chimica Acta, vol. 3, 1930, page 482) are dissolved in 100 parts by volume of a solution of sodium hydroxide and to this solution are added 120 parts by volume of 3% hydrogenperoxide. The yellow solution gets warm and changes its color to dark red. By treatment with ether a crude material is obtained which is purified by recrystallization from benzene and toluol. The 3-methyl-ether of the gallic aldehyde thus obtained melts at 135° C. The equation of this reaction is as follows:

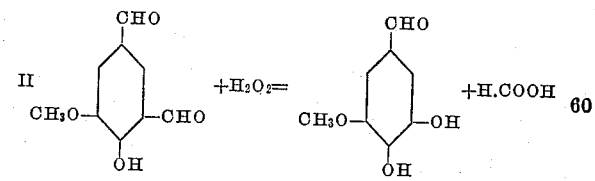

By methylating with dimethylsulphate syringa-aldehyde and trimethylgallic aldehyde may be obtained. The 3-methylether of the gallic aldehyde was proved to be identical with the monomethyl-ether of gallic aldehyde obtained by Späth and Röder (Monatshefte für Chemie 43, 1922, page 103) from nitroveratrol aldehyde; the assumption of these authors that their product was the 3-methylether was therefore justified.

I claim:

1. The process for the manufacture of a protocatechuic aldehyde which consists in treating compounds of the general type,

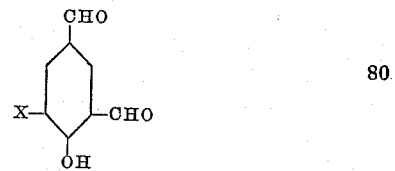

X representing hydrogen or alkoxy, with hydrogen peroxide in alkaline solution.

2. The process for the manufacture of protocatechuic aldehyde, which consists in treating 4-hydroxyisophthalaldehyde with hydrogenperoxide in alkaline solution.

In witness whereof I have hereunto set my hand.

FRANZ ELGER.